Nov. 29, 1966   F. J. CALLAHAN, JR., ETAL   3,288,494
UNION COUPLING
Filed Aug. 11, 1965
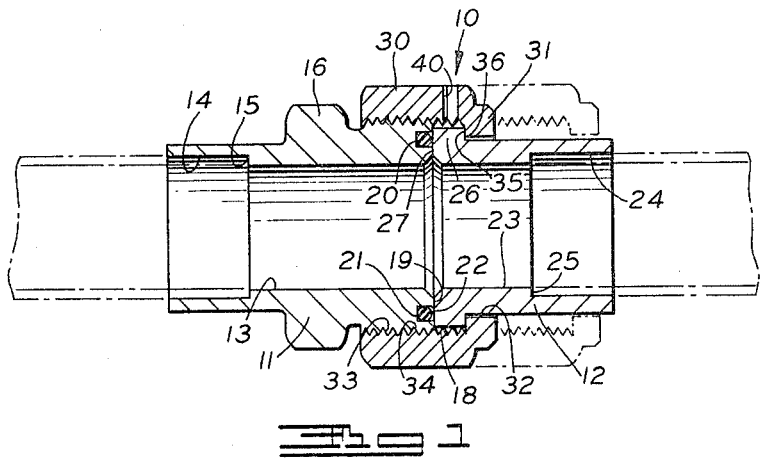
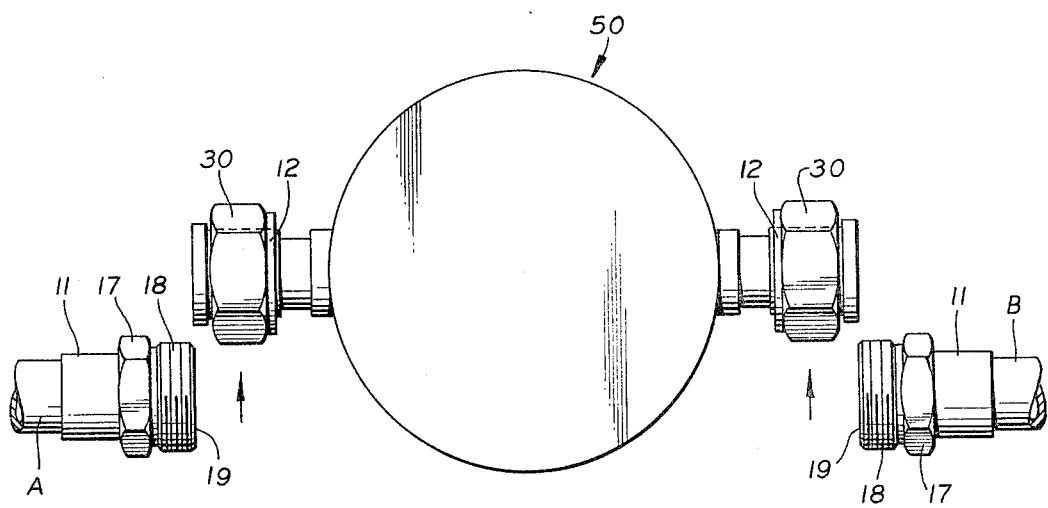
INVENTORS
FRANCIS J. CALLAHAN, JR.
ERLING G. WENNERSTROM
BY
Fay & Fay
ATTORNEYS United States Patent Office 3,288,494
Patented Nov. 29, 1966

3,288,494
UNION COUPLING
Francis J. Callahan, Jr., Chagrin Falls, and Erling G. Wennerstrom, Mayfield Village, Ohio, assignors to Cajon Company, Solon, Ohio, a corporation of Ohio
Filed Aug. 11, 1965, Ser. No. 478,826
1 Claim. (Cl. 285—14)

This invention relates to a union coupling and more particularly to a union coupling adapted to be used with tubular conduits whereby a device may be inserted into or removed from a fluid line without the necessity of any axial displacement of the lines.

It is an object of this invention to provide a union coupling.

It is a further object of this invention to provide a union coupling specially adapted to be used in a tubing system.

It is a more specific object of this invention to provide a vacuum coupling which permits removal of a component from the fluid line without the necessity of any axial movement of the fluid line.

A still further object of this invention is to provide a union coupling which permits the insertion of a component into a fluid system without the necessity of axial movement either by the fluid lines or the coupling.

Another object of the invention is to provide a vacuum coupling which includes a seal effective when the coupling is assembled fingertight and which will withstand a helium leak test.

More specifically, the invention contemplates first and second body members having a passage therethrough adapted to receive the end of a length of tubing in the outer ends thereof. The inner ends of the body members include radial end faces transverse to the passages therethrough. Thread means are provided on the exterior surface of the first body member adjacent to the inner end thereof. A groove is formed in the end face of said first member concentric with the passage therethrough with said groove being spaced radially outwardly of the passage in the member and radially inwardly of the thread means. Said second body member includes a radially extending flange adjacent to the inner end thereof with the radial extent of said flange being less than the radial dimension of the portion of said first member on which said thread means are formed. A sleeve surrounds a portion of said second member with said sleeve including an inwardly turned flange in sliding engagement with the exterior of said second member. Said inwardly turned flange has a radial dimension less than the radial dimension of said radially extending flange whereby the sliding movement of said sleeve is restricted by engagement of the flanges. Threads in the interior of the sleeve are adapted to engage with the thread means on said first member whereby said first and second members may be secured together with their respective end faces in abutment. The length of the sleeve is less than the axial length of the second body whereby the sleeve may be displaced between a position of fully overlying said second member and a position of axial extension beyond the end face of said second member. O-ring sealing means are disposed in said groove with the cross-sectional dimension of said O-ring being greater than the depth of said groove whereby abutment of said end face causes sealing engagement of the O-ring with the end face on said second member.

Other advantages and features will become more apparent upon a complete reading of the following description which sets forth in detail one approved means of carrying out the invention. Such disclosed means is not meant to be limiting inasmuch as it constitutes but one of the various ways in which the principles of the invention may be applied.

In the drawings wherein like reference numerals indicate like parts in the various views:

FIGURE 1 is a sectional view showing the coupling as it is assembled on the ends of opposed lengths of tubing.

FIGURE 2 is a schematic plan view illustrating the utilization of the instant invention in the removal of a section from a fluid system.

Referring first to FIGURE 1, there is illustrated a coupling, indicated generally by the reference numeral 10, which comprises the instant invention. This coupling is composed of a first body member 11 and a second body member 12. The first body member includes a through passage 13 with a counterbored entrance 14 at one end thereof. A shoulder 15 is formed at the junction of the counterbore and the passage and provides an abutment for tubing which may be inserted in the counterbore 14. This is illustrated in dotted lines in FIGURE 1.

The body 11 includes a radially extending portion 16 on which are formed tool pads 17. Adjacent the radially extending portion are external threads 18 which terminate at an end face 19 on the body 11.

A circumferential groove 20 is formed in the end face 19 and opens outwardly thereof. The bottom wall 21 of the groove 20 extends substantially transverse to the axis of the fitting 11 with the sidewalls of the groove being substantially parallel to the axis of the fitting. It is to be noted that the groove 20 is disposed intermediate the radial extent of the end face 19, that is, radially inwardly of the external threads 18 and radially outwardly of the passage 13 through the body 11. A resilient O-ring seal 22 is adapted to be received in the groove 20 with the cross-sectional thickness of the seal being greater than the depth of the groove 20 so that the O-ring protrudes externally of the groove to a small degree.

The fitting body 12 has a passage 23 similar in dimension to the passage 13 through the body 11. A counterbore 24 with a transverse shoulder 25 provides means whereby the body 12 may be secured to the end of a length of tubing as shown in dotted lines in FIGURE 1.

The body 12 is of a substantially smooth cylindrical exterior configuration with a radially extending flange 26 at the end of the body 12 opposite to the counterbore 24. The radial extent of the flange 26 is less than the radial dimension of the portion of the body 11 on which the external threads 18 are formed. A transverse end face 27 is formed on the inner end of the fitting body 12.

A sleeve 30 is adapted to be telescopically received over the fitting body 12. This sleeve includes a central cavity 33 with an inwardly directed flange 31 at one end thereof. The flange 31 defines a passage 32 thru the sleeve closely approximating the outer dimension of the body 12. Threads 34 are formed in the central cavity 33 in the interior of the sleeve 30 and are adapted to engage the threads 18 on the body member 11.

The flange 31 defines a transverse shoulder 35 which, in the extended position of the sleeve 30, is adapted to about a corresponding transverse surface 36 on the flange 26 thereby limiting the range of forward travel of the sleeve.

In the assembled condition of the coupling, as shown in FIGURE 1, the end face 19 on the body 11 abuts the corresponding transverse end face 27 on the body member 12. The sleeve 30 is slid along the surface of the body 12 until the threads 34 in the sleeve 30 are engaged by the threads 18 on the body member 11. The sleeve 30 is then threaded on the threads 18 until surface 35 on inwardly directed flange 31 engages surface 36 on flange 26. In this position the two body members are securely interlocked. The resilient O-ring 22, being slightly larger than the groove 20, protrudes externally of the groove and abuts the transverse end face 27 on the member 12. In this position the resilience of the O-ring provides a tight seal at the abuting joint formed by the end faces and precludes the escape of any fluid in the system.

As a check on the integrity of the joint, a helium leak test port 40 is formed in the sleeve 30. This port is located such that it opens into the cavity 33 in the sleeve 30 and is positioned, when the coupling is assembled, adjacent to the abuting transverse end faces 19, 27. Introduction of helium thru the port 40 will readily determine the character of the joint.

The above described fitting is particularly advantageous in a system wherein it is contemplated that a section of the system will be periodically removed or replaced. Thus, there is illustrated in FIGURE 2, a device, such as a valve or meter indicated generally by the reference numeral 50, which may be employed in a line. In such circumstances a body member 11 may be secured to one end of a length of tubing A. Similarly a second body member 11 may be secured to the end of a second length of tubing B. The valve or meter will have secured at opposite ends thereof the corresponding body members 12. When it is desired to remove the device 50 from the fluid line, the sleeves 30 on each of the body members 12 are threaded rearwardly to a position wherein they overly the cylindrical portion of the body member. Thereafter it is a simple matter of lifting the valve or meter 50 from the fluid line without any need to axially displace either the tubing A, B or any other portions of the couplings 10. This is to be distinguished from the prior art where invariably it is necessary for some axial displacement of the tubing system in order to effect the removal of a portion of the system. In such circumstances, there is a definite possibility that the axial displacement of the tubing may have an adverse effect on other joints in the system thereby giving rise to some leakage. This is particularly true if repeated removals and insertions are necessary. It is apparent that the desirable end achieved herein is accomplished by the provision of a simplified sealing joint in the form of two transverse end faces with a resilient seal disposed in a groove in only one of the end faces. With such an arrangement, the removal of the section from the tubing may be effected without any adverse effect on the O-ring seals.

Modifications and changes in the above described invention will suggest themselves to those having ordinary skill in the art. Changes and modifications such as these are contemplated by the principles of this invention so that although for ease of description, the principles of the invention have been set forth in connection with but a single illustrated embodiment, it is not intended that this illustrated embodiment or the terminology employed in describing it to be limiting. Rather, it is my desire to be restricted only by the scope of the appended claim.

We claim:

A union adapted to be used in a tubing system comprising:
- first and second body members having passages therethrough;
- each of said body members having a counterbored portion in one end thereof coaxial with said passages adapted to receive the end of a length of tubing;
- the ends of each of said body members opposite to said counterbored portions including planar radially extending end faces transverse to the axis of the passages therethrough with the radially outer extremity of each end face being in the same plane as the radially inner point of its respective end face;
- a radially extending flange formed on first of said body members adjacent the other end thereof;
- thread means formed on the exterior surface of the second of said body members with said thread means terminating at the end face on said second body member;
- a groove formed in the end face of said second member opening axially of said second member and being concentric wiht the passage in said second member;
- said groove being spaced radially outwardly of the passage in said member and radially inwardly of said thread means;
- a cylindrical sleeve surrounding a portion of said first member;
- said sleeve including a central cavity and an inwardly turned flange in sliding engagement with the exterior of said member;
- said inwardly turned flange having a radial dimension less than the radial dimension of said radially extending flange on said first member whereby the sliding movement of said sleeve on said member is restricted by the engagement of said flanges;
- threads in the cavity in said sleeve adapted to engage with the thread means on said second member whereby said first and second members may be secured together with their respective end faces in abutment;
- said threads in the cavity extending from the forward end thereof to a point immediately adjacent said inwardly turned flange whereby with the sleeve assembled in threaded engagement on said second member said threads overlie said radially extending flange on said first member;
- the radial extent of said flange on the first of said body members being substantially equal to the pitch diameter of the threads in the cavity in said sleeve;
- the length of said sleeve being less than the axial length of said second member but greater than twice the axial extent of said radial flange whereby said sleeve may be displaced between a position fully overlying said second member and a position of axial extension beyond the end face of said second member;
- said sleeve further including a single radially extending leak test aperture through said sleeve and communicating with said cavity therein;
- said aperture being positioned adjacent said inwardly turned flange whereby in the assembled position of said coupling said aperture overlies said radially extending flange;
- a resilient O-ring sealing means disposed in said groove;
- the cross-sectional dimension of said O-ring being greater than the depth of said groove whereby abutment of said end faces causes sealing engagement of said O-ring with said end face on said first member.

References Cited by the Examiner

UNITED STATES PATENTS

| | | | |
|---|---|---|---|
| 344,312 | 6/1886 | Guillemin | 285—349 X |
| 392,931 | 11/1888 | Prindle | 285—354 X |
| 2,208,353 | 7/1940 | Woolley | 285—354 X |
| 2,335,040 | 11/1943 | Bruno | 285—287 X |
| 2,381,829 | 8/1945 | Livers | 285—349 X |
| 2,795,437 | 6/1957 | Mueller | 285—30 X |
| 2,967,068 | 1/1961 | Gressel | 285—14 |

FOREIGN PATENTS

| | | |
|---|---|---|
| 1,063,620 | 12/1953 | France. |
| 563,339 | 11/1932 | Germany. |

CARL W. TOMLIN, *Primary Examiner.*